US012738433B2

(12) United States Patent
Guo et al.

(10) Patent No.: US 12,738,433 B2
(45) Date of Patent: Sep. 15, 2026

(54) KEYBOARD DEVICE

(71) Applicant: SUNREX TECHNOLOGY CORP., Taichung City (TW)

(72) Inventors: Jian-Guo Guo, Changshu (CN); Fei Mei, Changshu (CN); Shih-Pin Lin, Taichung City (TW)

(73) Assignee: SUNREX TECHNOLOGY CORP., Taichung City (TW)

( * ) Notice: Subject to any disclaimer, the term of this patent is extended or adjusted under 35 U.S.C. 154(b) by 276 days.

(21) Appl. No.: 18/765,586

(22) Filed: Jul. 8, 2024

(65) Prior Publication Data

US 2025/0292974 A1 Sep. 18, 2025

(30) Foreign Application Priority Data

Mar. 15, 2024 (TW) ................................ 113109644

(51) Int. Cl.

*H01H 13/702* (2006.01)
*H01H 13/14* (2006.01)
*H01H 13/20* (2006.01)

(52) U.S. Cl.

CPC .......... *H01H 13/702* (2013.01); *H01H 13/14* (2013.01); *H01H 13/20* (2013.01); *H01H 2215/028* (2013.01)

(58) Field of Classification Search

CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20

See application file for complete search history.

(56) References Cited

U.S. PATENT DOCUMENTS

| | | | | | |
|---|---|---|---|---|---|
| 5,466,901 | A * | 11/1995 | Mochizuki | H01H 3/125 | |
| | | | | 200/344 | |
| 11,770,123 | B2 * | 9/2023 | Yang | H01H 13/14 | |
| | | | | 250/224 | |
| 2020/0358440 | A1 * | 11/2020 | Morrison | H01F 7/0273 | |
| 2021/0249203 | A1 * | 8/2021 | Yang | H01H 13/70 | |

* cited by examiner

*Primary Examiner* — Ahmed M Saeed
(74) *Attorney, Agent, or Firm* — Birch, Stewart, Kolasch & Birch, LLP

(57) ABSTRACT

A keyboard device includes a base plate having a base plate body, a top plate, an adjustment module, at least one keycap, a sensor module, at least one pushing member, and at least one scissor-switch module. The top plate has a top plate body cooperating with the base plate body to define a movement space. The adjustment module has an intermediate plate body, and a torsion resilient member having a biasing portion. The scissor-switch module includes a first frame unit having a first frame member and a pressing block. The intermediate plate body is movable in the movement space between a first pressure position, where the biasing portion of the torsion resilient member is disposed outside of a movement path of the pressing block, and a second pressure position, where the biasing portion of the torsion resilient member is disposed on the movement path of the pressing block.

9 Claims, 11 Drawing Sheets

KEYBOARD DEVICE

CROSS-REFERENCE TO RELATED APPLICATION

This application claims priority to Taiwanese Invention Patent Application No. 113109644, filed on Mar. 15, 2024, the entire disclosure of which is incorporated by reference herein.

FIELD

The disclosure relates to a keyboard device, and more particularly to a keyboard device having adjustable tactile feedback.

BACKGROUND

A conventional keyboard switch as disclosed in Taiwanese Invention Patent No. 1728209B includes a key cap, a plunger that is engaged with a bottom portion of the key cap, a rubber cap that is disposed at a bottom end of the plunger, a housing that surrounds the plunger and the rubber cap, a plate that is supported by the housing, and a spacer that is disposed between the plate and the key cap. The spacer may be installed to or uninstalled from the conventional keyboard device to alter a keystroke of the conventional keyboard switch.

However, for the conventional keyboard switch, only the customization of the length of keystrokes is provided to fulfill needs like faster quick combos in gaming or faster typing speeds, and other customizable features are not offered. Hence, there is room for improvement in related fields.

SUMMARY

Therefore, an object of the disclosure is to provide a keyboard device that can alleviate at least one of the drawbacks of the prior art.

According to the disclosure, the keyboard device includes a base plate, a top plate, an adjustment module, at least one keycap, a sensor module, at least one pushing member, and at least one scissor-switch module. The base plate has a base plate body. The top plate has a top plate body and a plurality of lower pivoting joint portions. The top plate body has at least one open hole, and cooperates with the base plate body of the base plate to define a movement space. The plurality of lower pivoting joint portions extend upwardly from the top plate body. The adjustment module has an intermediate plate body, at least one accommodating seat, and at least one torsion resilient member. The intermediate plate body is disposed in the movement space, and is movable along an axis extending in a front-rear direction. The at least one accommodating seat is fixed to the intermediate plate body, and extends through the at least one open hole. The at least one torsion resilient member is mounted to the at least one accommodating seat, and has a resilient member body and a biasing portion. The resilient member body is disposed in the at least one accommodating seat. The biasing portion is connected to the resilient member body. The at least one keycap is disposed above the top plate and the at least one accommodating seat, and has an outer surface, an inner surface opposite to the outer surface, and a plurality of upper pivoting joint portions extending from the inner surface. The sensor module is disposed between the top plate body and the at least one keycap, and has at least one pivoting joint hole. The lower pivoting joint portions extend through the at least one pivoting joint hole. The at least one pushing member is disposed between the sensor module and the at least one keycap for resiliently supporting the at least one keycap thereon. The at least one scissor-switch module is connected between the upper pivoting joint portions and the lower pivoting joint portions, and surrounds the at least one pushing member. The at least one scissor-switch module includes first and second frame units that are pivotably connected to each other. The first frame unit has a first frame member and a pressing block that is fixed to the first frame member. The intermediate plate body is moveable in the movement space along the axis extending in the front-rear direction to move between a first pressure position and a second pressure position. When the intermediate plate body is in the first pressure position, the biasing portion of the at least one torsion resilient member is disposed outside of a movement path of the pressing block and is not pressed by the pressing block during pivot action of the first and second frame units. When the intermediate plate body is in the second pressure position, the biasing portion is disposed under the pressing block and on the movement path of the pressing block, such that the biasing portion is pressed by the pressing block during the pivot action of the first and second frame units.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
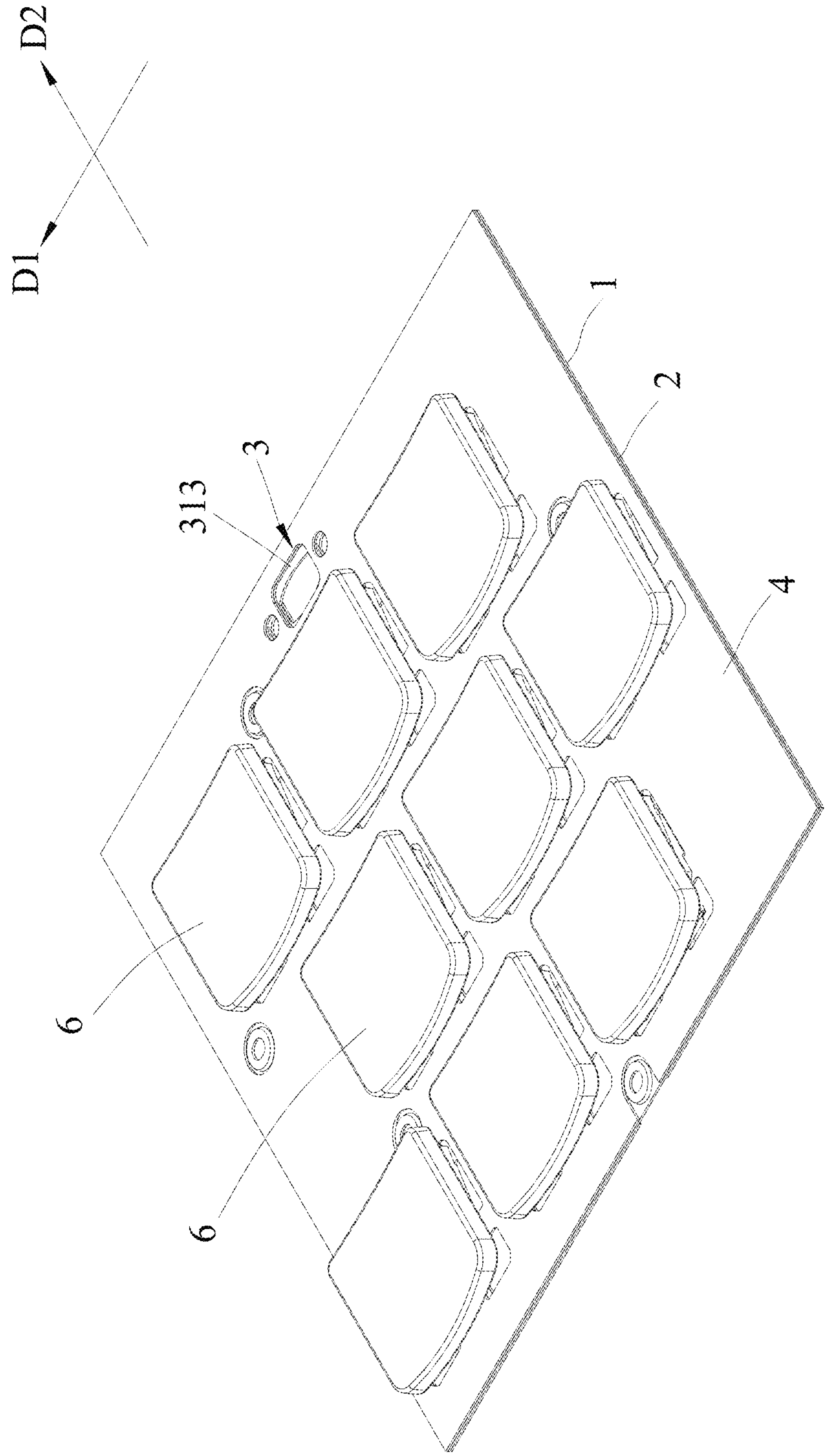
FIG. 1 is a perspective view illustrating an embodiment of a keyboard device according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
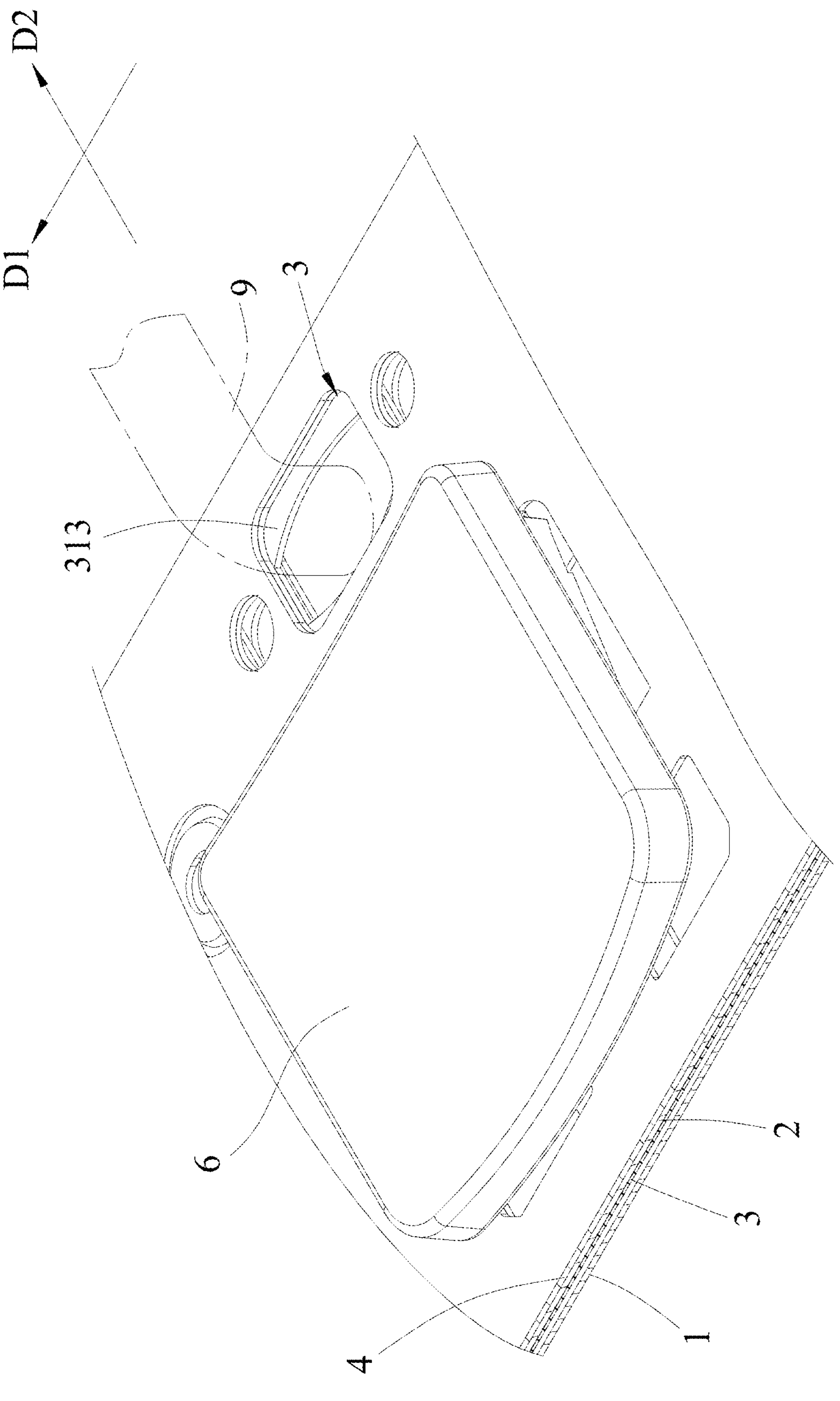
FIG. 2 is a fragmentary perspective view of the embodiment.

Referring to FIGS. 1 and 2, an embodiment of a keyboard device according to the disclosure is adapted to be adjusted by an adjustment shaft 9.

The keyboard device includes a base plate 1, a top plate 2, an adjustment module 3, a sensor module 4, at least one pushing member 5, at least one keycap 6, and at least one scissor-switch module 7. In this embodiment, each of a number of the at least one pushing member 5, a number of the at least one keycap 6, and a number of the at least one scissor-switch module 7 is nine; however, in other embodiments, each number may be one. Unless stated otherwise, only one pushing member 5, one keycap 6, and one scissor-switch module 7 will be described in the following for the sake of brevity.

Figure 3:
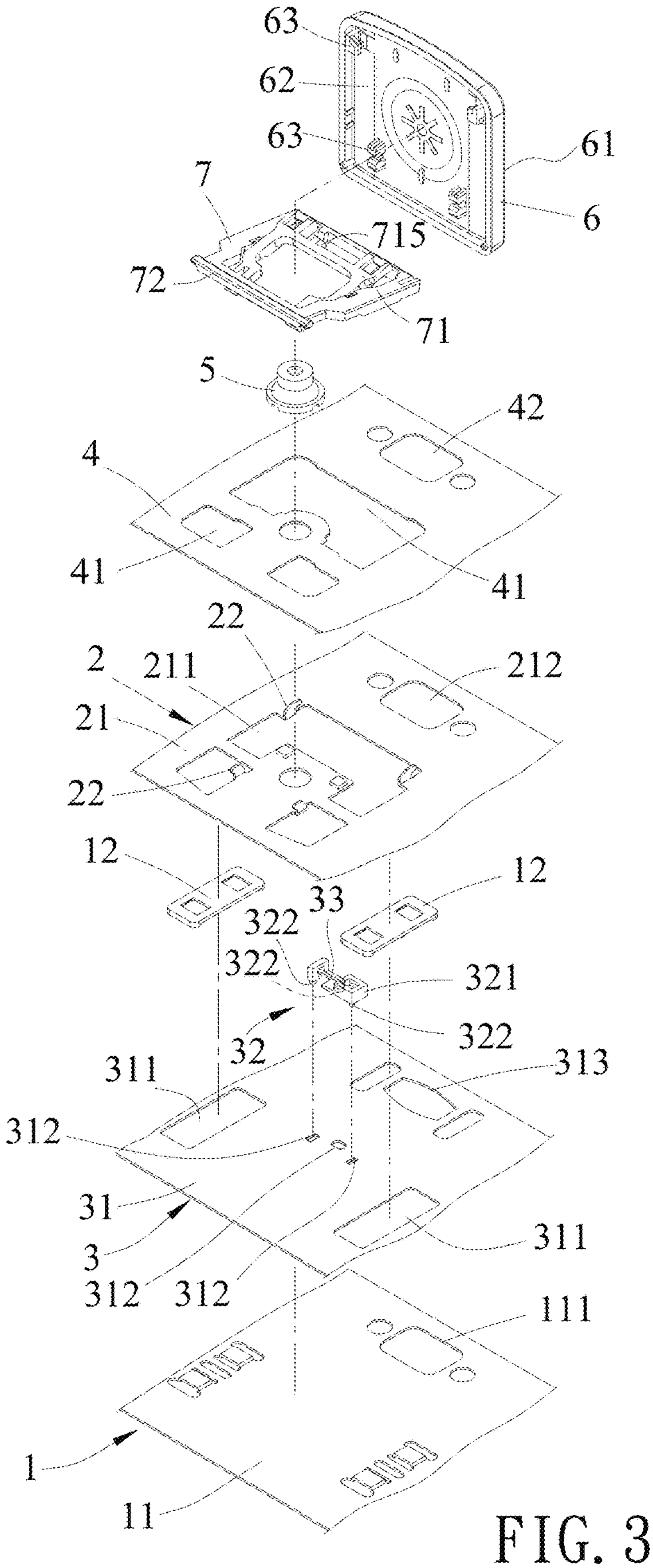
FIG. 3 is a fragmentary exploded perspective view of the embodiment.
Figure 4:
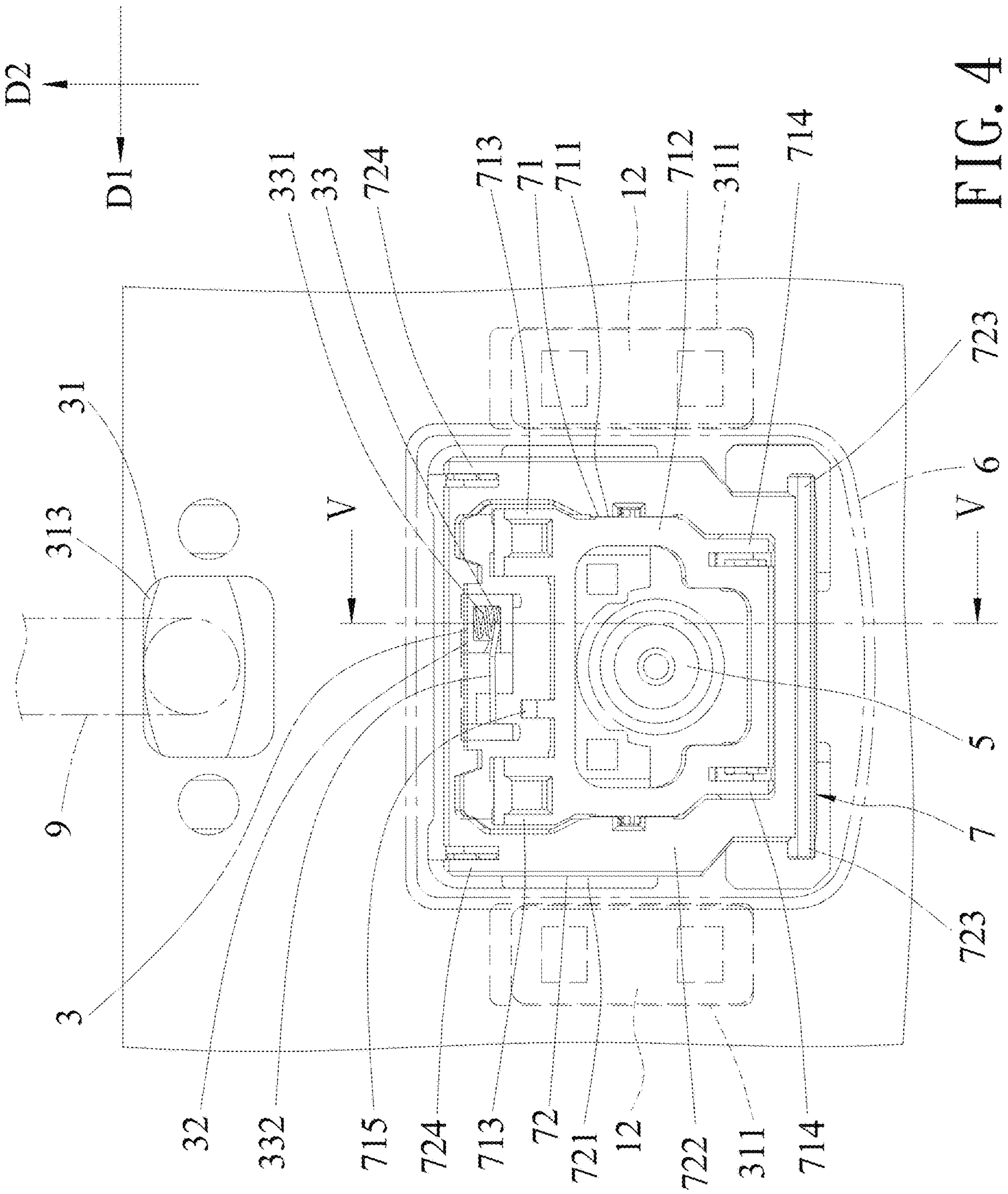
FIG. 4 is a fragmentary top view of the embodiment, illustrating an intermediate plate body in a first pressure position.
Figure 5:
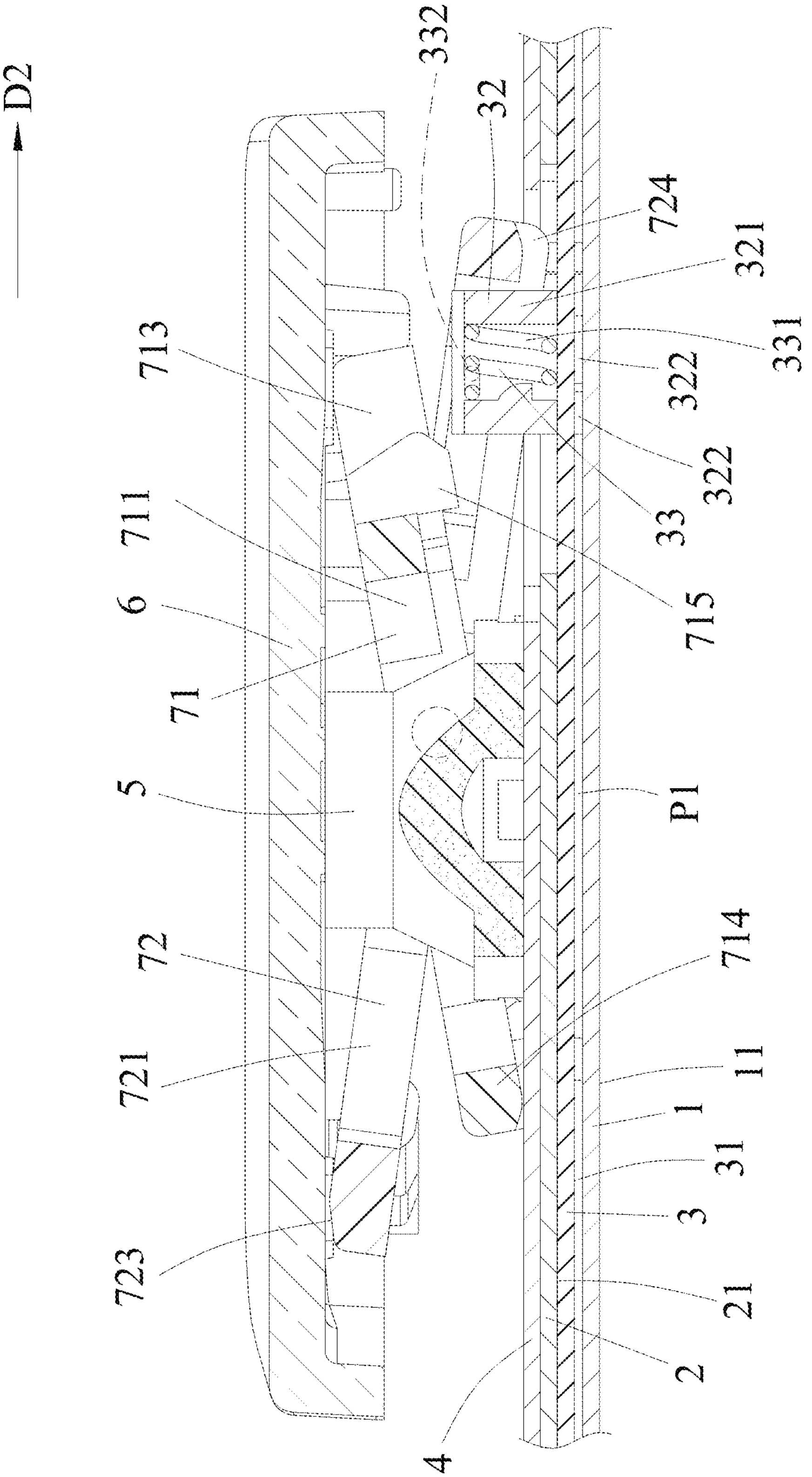
FIG. 5 is a fragmentary sectional view of the embodiment taken along line V-V in FIG. 4, illustrating a keycap in an original position.

Referring to FIGS. 3 to 5, the base plate 1 has a base plate body 11 and a plurality of limiting portions 12. The limiting portions 12 are connected to a top end of the base plate body 11. The base plate body 11 is formed with a lower adjustment hole 111.

The top plate 2 has a top plate body 21 and a plurality of lower pivoting joint portions 22 extending upwardly from the top plate body 21. The top plate body 21 is in contact with the limiting portions 12, has at least one open hole 211, is formed with an upper adjustment hole 212, and cooperates with the base plate body 11 of the base plate 1 to define a movement space (P1). A position of the upper adjustment hole 212 corresponds to a position of the lower adjustment hole 111. In this embodiment, the top plate body 21 has one open hole 211, and a number of the lower pivoting joint portions 22 is four.

The adjustment module 3 has an intermediate plate body 31, at least one accommodating seat 32, and at least one torsion resilient member 33. The intermediate plate body 31 is disposed in the movement space (P1), and is movable along an axis extending in a front-rear direction (D2). The at least one accommodating seat 32 is fixed to the intermediate plate body 31, and extends through the at least one open hole 211. The at least one torsion resilient member 33 is mounted to the at least one accommodating seat 32. In this embodiment, each of a number of the at least one accommodating seat 32 and a number of the at least one torsion resilient member 33 is one, but they may be changed in other embodiments as needed.

The intermediate plate body 31 has a plurality of limiting holes 311, at least one engaging hole 312, and an adjustment portion 313. The limiting portions 12 extend respectively through the limiting holes 311. The adjustment portion 313 is exposed from the upper and lower adjustment holes 212, 111, and is adapted to be engaged with the adjustment shaft 9. It should be noted that, in this embodiment, a number of the at least one engaging hole 312 is three, but the number may be changed as needed in other embodiments. A number of the limiting holes 311 is equal to a number of the limiting portions 12.

The accommodating seat 32 has an accommodating body 321 and at least one protrusion 322. In this embodiment, a number of the at least one protrusion 322 is three, but it may be changed in other embodiments as needed. The protrusions 322 extend from the accommodating body 321, respectively through the engaging holes 312, and are connected to the base plate body 11.

The torsion resilient member 33 has a resilient member body 331 that is disposed in the accommodating seat 32, and a biasing portion 332 that is connected to the resilient member body 331. When the biasing portion 332 is pressed, a torsion is stored in the resilient member body 331. In this embodiment, the torsion resilient member 33 is a torsion spring.

The sensor module 4 is disposed between the top plate body 21 and the keycap 6, and has at least one pivoting joint hole 41, and an auxiliary adjustment hole 42 that corresponds in position to the lower and upper adjustment holes 111, 212. The lower pivoting joint portions 22 extend through the at least one pivoting joint hole 41. In this embodiment, the sensor module 4 has a plurality of pivoting joint holes 41. The sensor module 4 senses how far the keycap 6 is pressed down; in this embodiment, the sensor module 4 is a membrane switch.

The pushing member 5 is disposed between the sensor module 4 and the keycap 6 for resiliently supporting the keycap 6 thereon. In this embodiment, the pushing member 5 is a rubber dome.

The keycap 6 is disposed above the top plate 2 and the accommodating seat 32, and has an outer surface 61, an inner surface 62 opposite to the outer surface 61, and a plurality of upper pivoting joint portions 63 extending from the inner surface 62. In this embodiment, a number of the upper pivoting joint portions 63 is four.

The scissor-switch module 7 is connected between the upper pivoting joint portions 63 and the lower pivoting joint portions 22, surrounds the pushing member 5, and includes first and second frame units 71, 72 that are pivotably connected to each other.

The first frame unit 71 has a first frame member 711 and a pressing block 715 that is fixed to the first frame member 711. In this embodiment, the first and second frame units 71, 72 are fixed on a pivot. The first frame member 711 has a first frame body 712, two first upper pivoting portions 713 connected to the first frame body 712 and spaced apart in a left-right direction (D1), and two first lower pivoting portions 714 connected to the first frame body 712 and spaced apart in the left-right direction (D1) that is perpendicular to the front-rear direction (D2).

The first upper pivoting portions 713 are rotatably and respectively engaged with two of the upper pivoting joint portions 63, and the first lower pivoting portions 714 are rotatably and respectively engaged with two of the lower pivoting joint portions 22. The pressing block 715 is connected to the first frame member 711 and is disposed between the first upper pivoting portions 713.

The second frame unit 72 has a second frame member 721 that has a second frame body 722, two second upper pivoting portions 723 connected to the second frame body 722 and arranged in the left-right direction (D1), and two second lower pivoting portions 724 connected to the second frame body 722 and spaced apart in the left-right direction (D1). The second upper pivoting portions 723 are rotatably and respectively engaged with the remaining upper pivoting joint portions 63, and the second lower pivoting portions 724 are rotatably and respectively engaged with the remaining lower pivoting joint portions 22. In this embodiment, the second upper pivoting portions 723 are configured as a one-piece pivot shaft.

Figure 8:
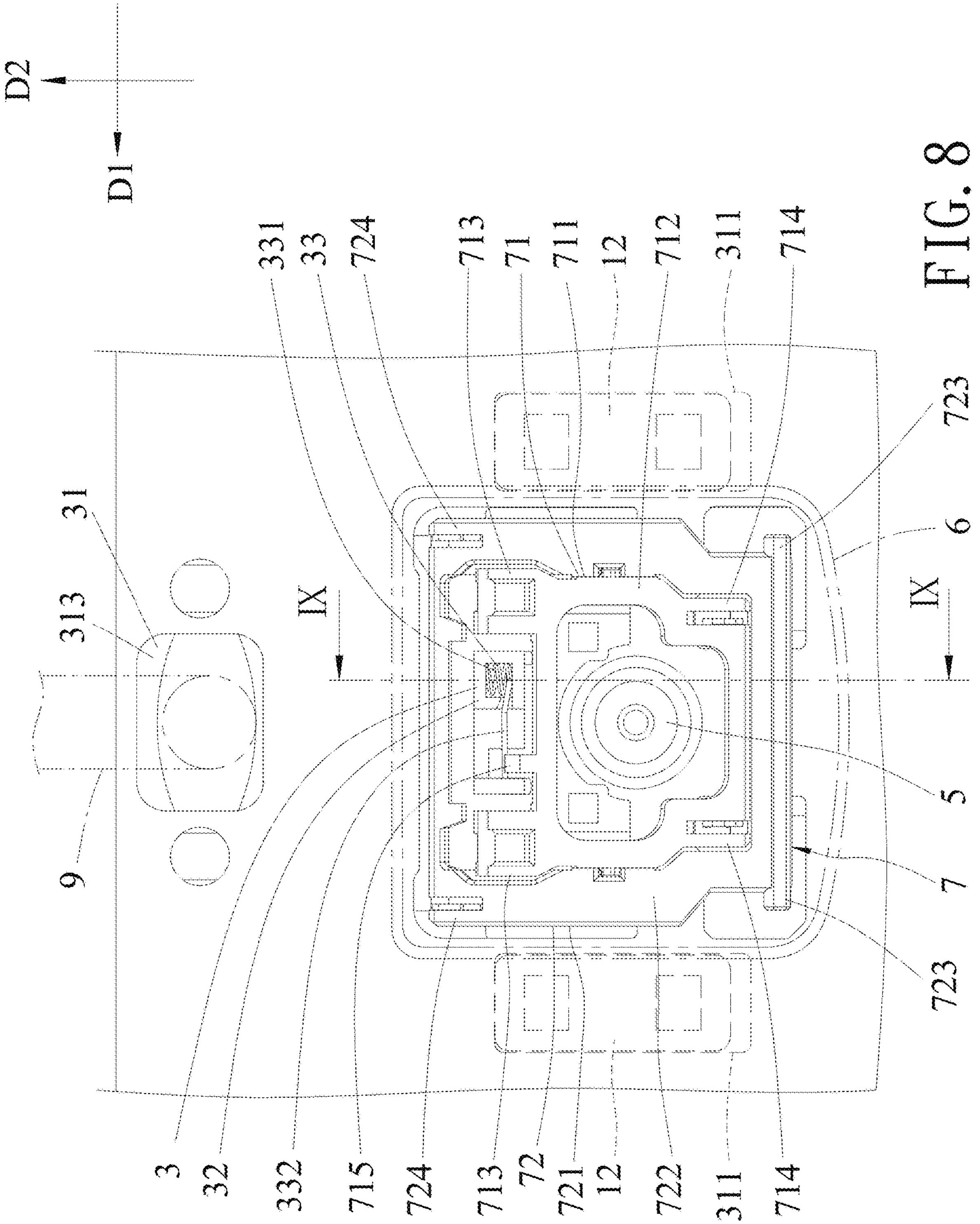
FIG. 8 is a fragmentary top view of the embodiment, illustrating the intermediate plate body in a second pressure position.

The intermediate plate body 31 is movable in the movement space (P1) along the axis extending in the front-rear direction (D2) to move between a first pressure position (FIG. 4) and a second pressure position (FIG. 8). Specifically, when the intermediate plate body 31 is moved between the first pressure position and the second pressure position, the intermediate plate body 31 is moved relative to the limiting portions 12, and the limiting portions 12 limit a range of movement of the intermediate plate body 31.

Referring to FIG. 4, the intermediate plate body 31 may be driven by the adjustment shaft 9 to move towards the first pressure position. During movement of the intermediate plate body 31 to the first pressure position, the biasing portion 332 of the torsion resilient member 33 is moved away from the scissor-switch module 7. When the intermediate plate body 31 is in the first pressure position, the biasing portion 332 of the torsion resilient member 33 is disposed outside of a movement path of the pressing block 715 during pivot action of the first and second frame units 71, 72.

Figure 6:
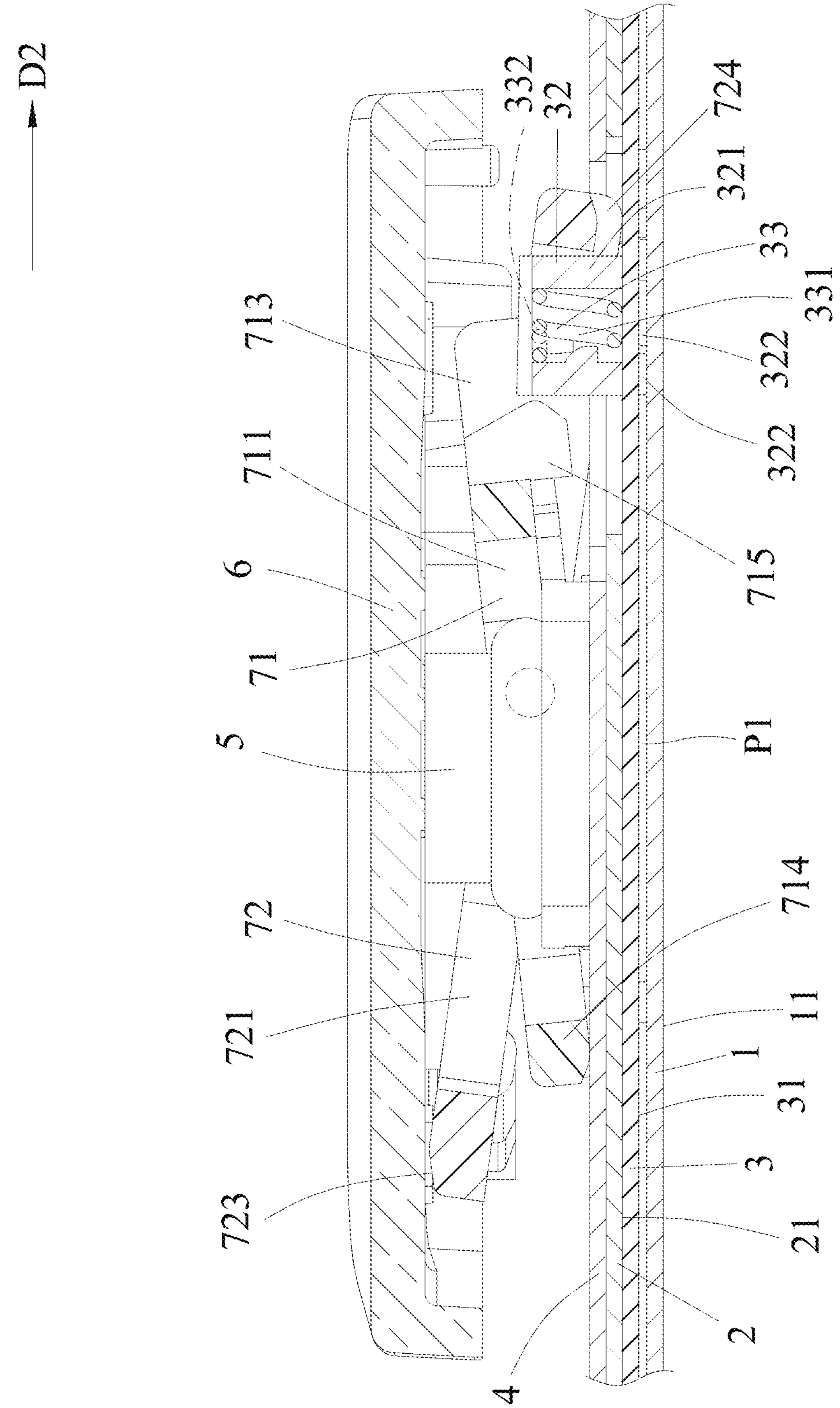
FIG. 6 is a fragmentary sectional view similar to FIG. 5, but illustrating the keycap being pressed.
Figure 7:
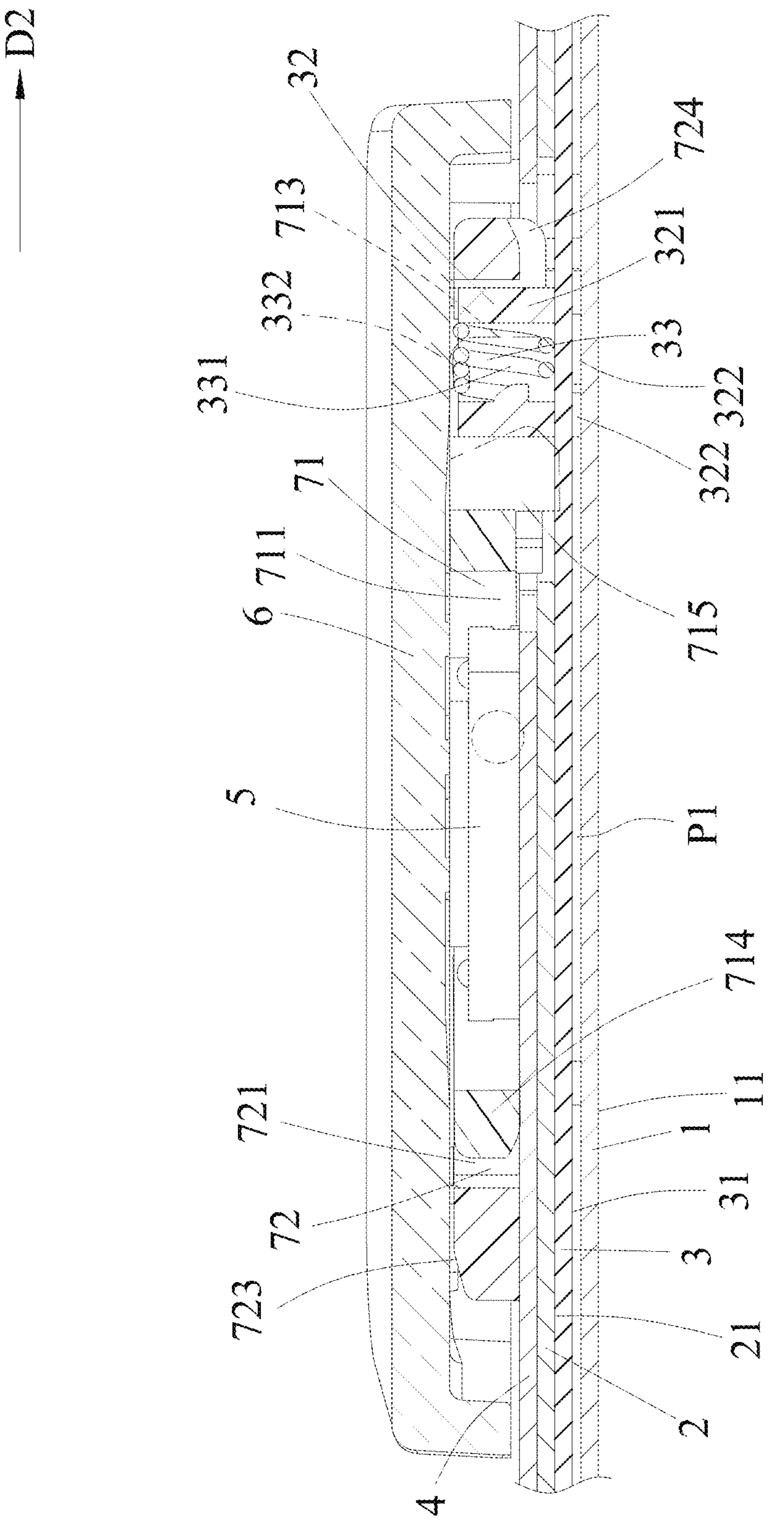
FIG. 7 is a fragmentary sectional view similar to FIG. 5, but illustrating the keycap being bottomed out.

Referring to FIGS. 5 to 7, during the keystroke (when the keycap 6 is pressed down from top to bottom), while the intermediate plate body 31 is in the first pressure position, by virtue of the configurations of the biasing portion 332 of the torsion resilient member 33 and the pressing block 715, the biasing portion 332 will not be pressed by the pressing block 715 during pivot action of the first and second frame units 71, 72, so that the keycap 6 is supported only by the pushing member 5, thereby resulting in a first tactile feedback (i.e., how the fingers of a user feel when pressing keys of a keyboard).

Referring to FIG. 8, the intermediate plate body 31 may be driven by the adjustment shaft 9 to move towards the second pressure position. During movement of the intermediate plate body 31 to the second pressure position, the biasing portion 332 of the torsion resilient member 33 is moved towards the scissor-switch module 7. When the intermediate plate body 31 is in the second pressure position, the biasing portion 332 is disposed under the pressing block 715 and on the movement path of the pressing block 715, such that the biasing portion 332 is pressed by the pressing block 715 during the pivot action of the first and second frame units 71, 72.

Figure 9:
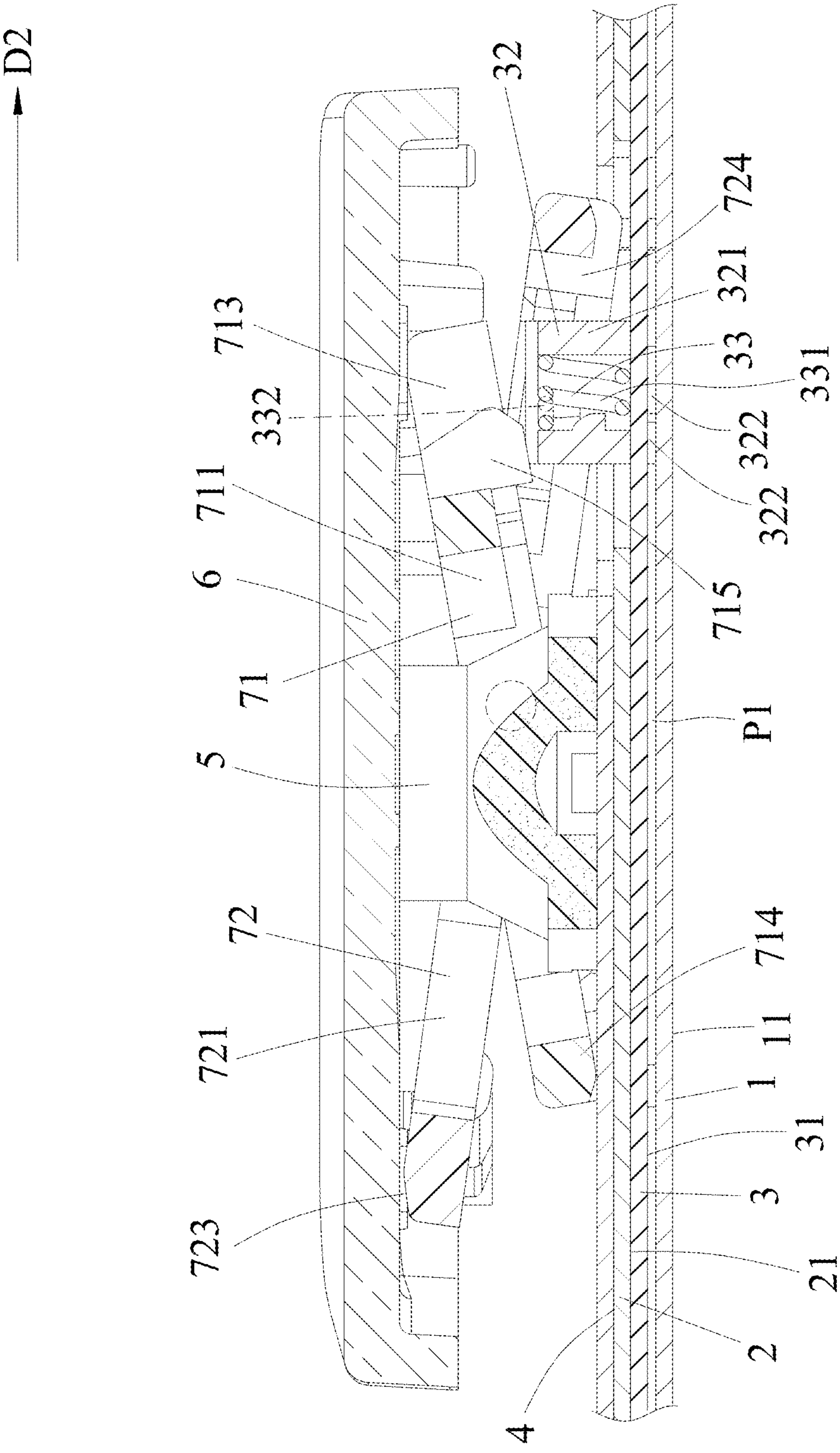
FIG. 9 is a fragmentary sectional view of the embodiment taken along line IX-IX in FIG. 8, illustrating the keycap in the original position.
Figure 10:
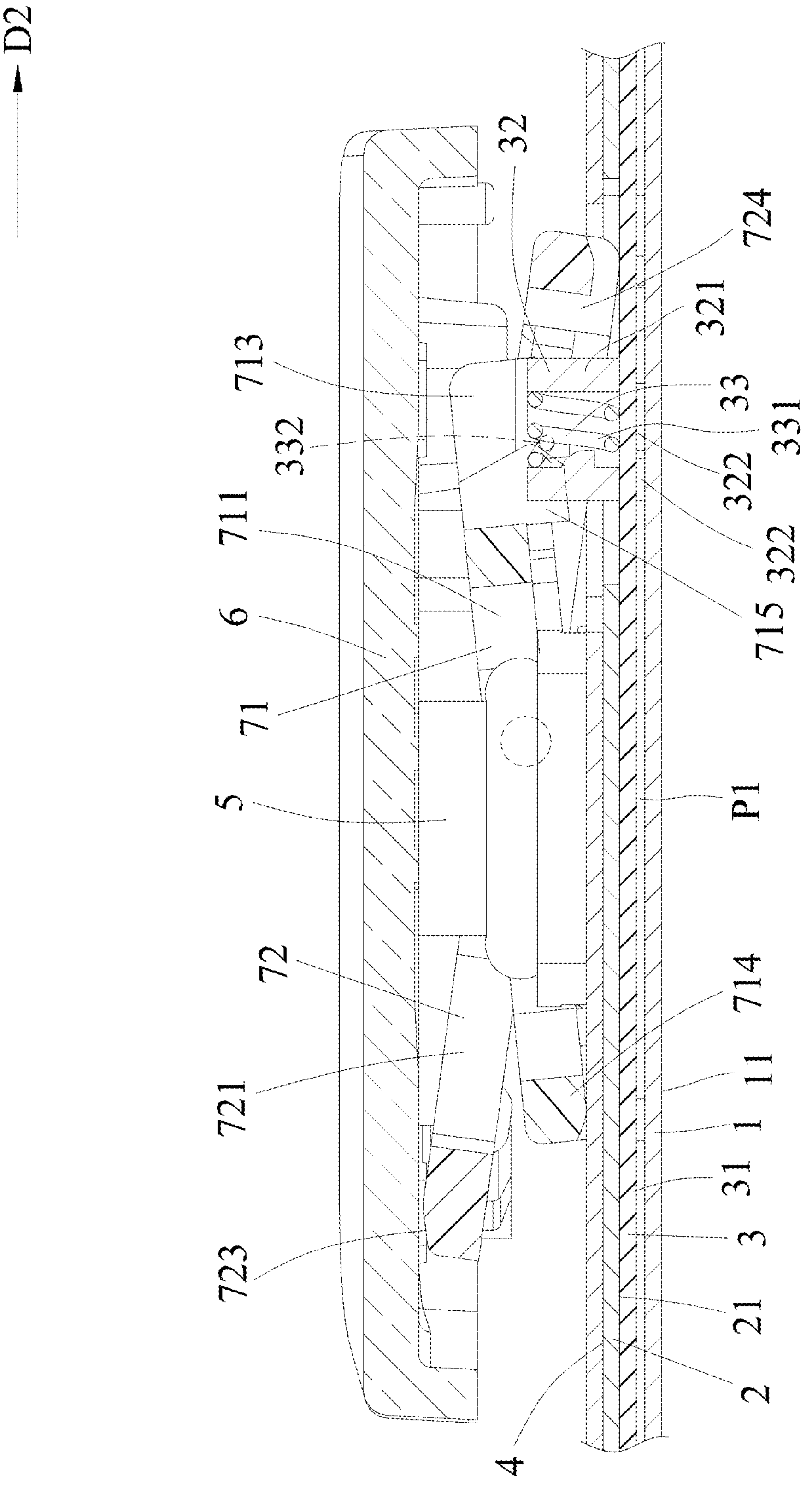
FIG. 10 is a fragmentary sectional view similar to FIG. 9, but illustrating the keycap being pressed.
Figure 11:
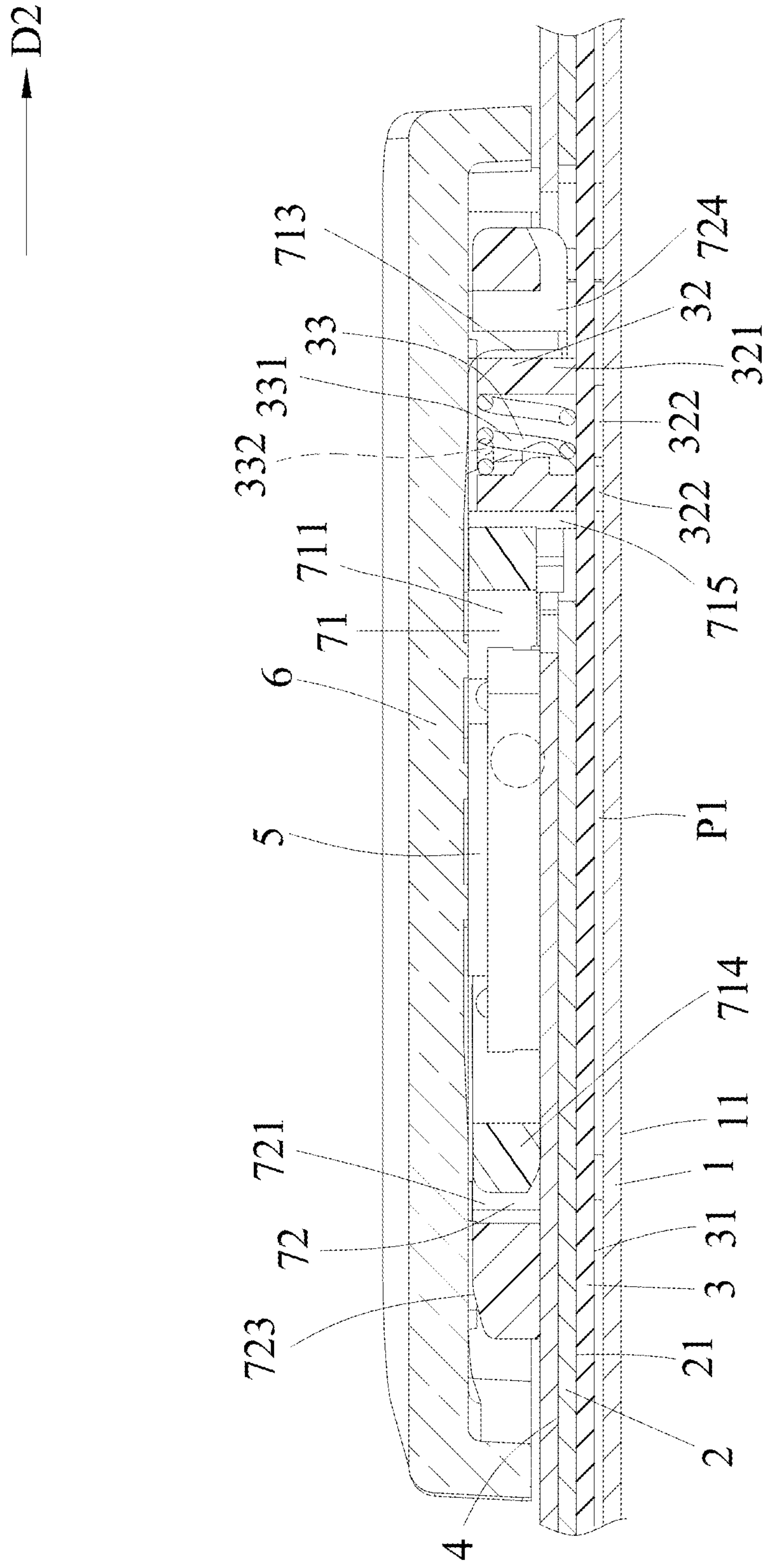
FIG. 11 is a fragmentary sectional view similar to FIG. 9, but illustrating the keycap being bottomed out.

Referring to FIGS. 9 to 11, during the keystroke, while the intermediate plate body 31 is in the second pressure position, by virtue of the configurations of the biasing portion 332 of the torsion resilient member 33 and the pressing block 715, the biasing portion 332 is pressed by the pressing block 715, so that the keycap 6 is supported by the torsion resilient member 33 and the pushing member 5, thereby resulting in a second tactile feedback that is bouncier for the user compared to the first tactile feedback.

In conclusion, by moving the intermediate plate body 31 in the movement space (P1) along the axis extending in the front-rear direction (D2), the intermediate plate body 31 may be moved between the first pressure position, where the biasing portion 332 of the torsion resilient member 33 is disposed outside of the movement path of the pressing block 715 during the pivot action of the first and second frame units 71, 72, so that only the pushing member 5 supports the keycap 6 when the keycap 6 is pressed down, and a second pressure position, where the movement path of the pressing block 715 intersects with the position of the biasing portion 332 during the pivot action of the first and second frame units 71, 72, so that the pushing member 5 and the torsion resilient member 33 support the keycap 6 when the keycap 6 is pressed down. By having different components to support the keycap 6 when the keycap 6 is being pressed down, the keyboard device provides two different tactile feedbacks for the user, thereby achieving an objective of the disclosure.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, the one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A keyboard device comprising:

a base plate that has a base plate body;

a top plate that has a top plate body having at least one open hole, and cooperating with said base plate body of said base plate to define a movement space, and a plurality of lower pivoting joint portions extending upwardly from said top plate body;

an adjustment module that has an intermediate plate body disposed in said movement space, and movable along an axis extending in a front-rear direction, at least one accommodating seat fixed to said intermediate plate body, and extending through said at least one open hole, and at least one torsion resilient member mounted to said at least one accommodating seat, and having a resilient member body that is disposed in said at least one accommodating seat, and a biasing portion that is connected to said resilient member body;

at least one keycap that is disposed above said top plate and said at least one accommodating seat, and that has an outer surface, an inner surface opposite to said outer surface, and a plurality of upper pivoting joint portions extending from said inner surface;

a sensor module that is disposed between said top plate body and said at least one keycap, and that has at least one pivoting joint hole, said lower pivoting joint portions extending through said at least one pivoting joint hole;

at least one pushing member that is disposed between said sensor module and said at least one keycap for resiliently supporting said at least one keycap thereon; and at least one scissor-switch module that is connected between said upper pivoting joint portions and said lower pivoting joint portions, and that surrounds said at least one pushing member, said at least one scissor-switch module including first and second frame units that are pivotably connected to each other, said first frame unit having a first frame member and a pressing block that is fixed to said first frame member;

wherein said intermediate plate body is moveable in said movement space along the axis extending in the front-rear direction to move between a first pressure position and a second pressure position;

wherein, when said intermediate plate body is in the first pressure position, said biasing portion of said at least one torsion resilient member is disposed outside of a movement path of said pressing block and is not pressed by said pressing block during pivot action of said first and second frame units; and wherein, when said intermediate plate body is in the second pressure position, said biasing portion is disposed under said pressing block and on the movement path of said pressing block, such that said biasing portion is pressed by said pressing block during the pivot action of said first and second frame units.

2. The keyboard device as claimed in claim 1, wherein said base plate further has a plurality of limiting portions connected to a top end of said base plate body, and in contact with said top plate body of said top plate.

3. The keyboard device as claimed in claim 2, wherein:

said intermediate plate body has a plurality of limiting holes, said limiting portions extending respectively through said limiting holes; and when said intermediate plate body is moved between the first pressure position and the second pressure position, said intermediate plate body is moved relative to said limiting portions, and said limiting portions limit a range of movement of said intermediate plate body.

4. The keyboard device as claimed in claim 1, wherein:

said intermediate plate body has at least one engaging hole; and said at least one accommodating seat has an accommodating body, and at least one protrusion extending from said accommodating body through said at least one engaging hole and connected to said base plate body.

5. The keyboard device as claimed in claim 1, wherein said first frame unit and said second frame unit are fixed on a pivot.

6. The keyboard device as claimed in claim 5, wherein:

a number of said upper pivoting joint portions of said at least one keycap is four, and a number of said lower pivoting joint portions is four;

said first frame member has a first frame body, two first upper pivoting portions connected to said first frame body, and spaced apart in a left-right direction, and two first lower pivoting portions connected to said first frame body and spaced apart in the left-right direction; and said first upper pivoting portions are rotatably and respectively engaged with two of said upper pivoting joint portions, said first lower pivoting portions are rotatably and respectively engaged with two of said lower pivoting joint portions, and said pressing block is connected to said first frame member and is disposed between said first upper pivoting portions.

7. The keyboard device as claimed in claim 6, wherein:

said second frame unit has a second frame member having a second frame body, two second upper pivoting portions that are connected to said second frame body and that are spaced apart in the left-right direction, and two second lower pivoting portions that are connected to said second frame body and that are spaced apart in the left-right direction; and said second upper pivoting portions are rotatably and respectively engaged with the remaining upper pivoting joint portions, and said second lower pivoting portions are rotatably and respectively engaged with the remaining lower pivoting joint portions.

8. The keyboard device as claimed in claim 1, wherein said sensor module is a membrane switch.

9. The keyboard device as claimed in claim 1, wherein said at least one pushing member is a rubber dome.

* * * * *